UNITED STATES PATENT OFFICE.

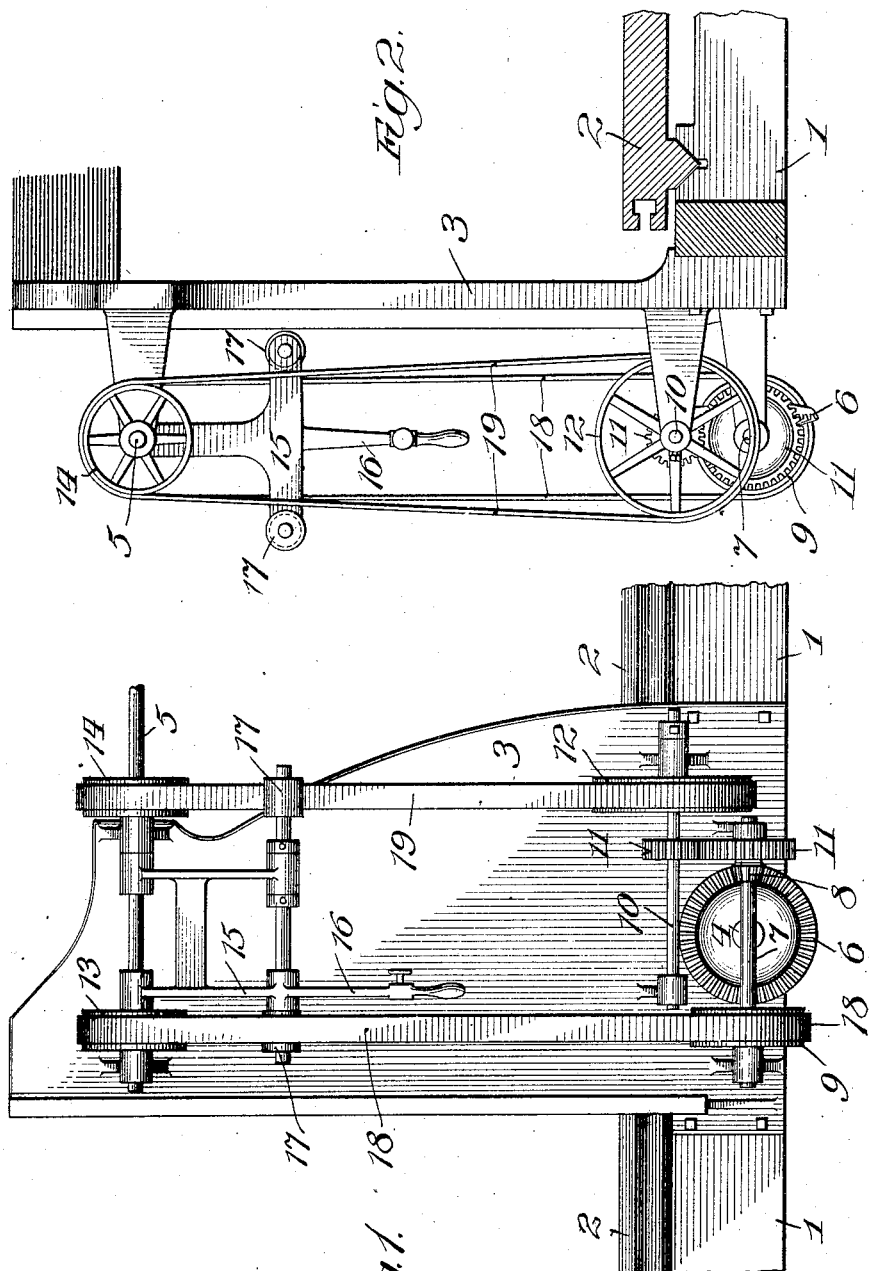

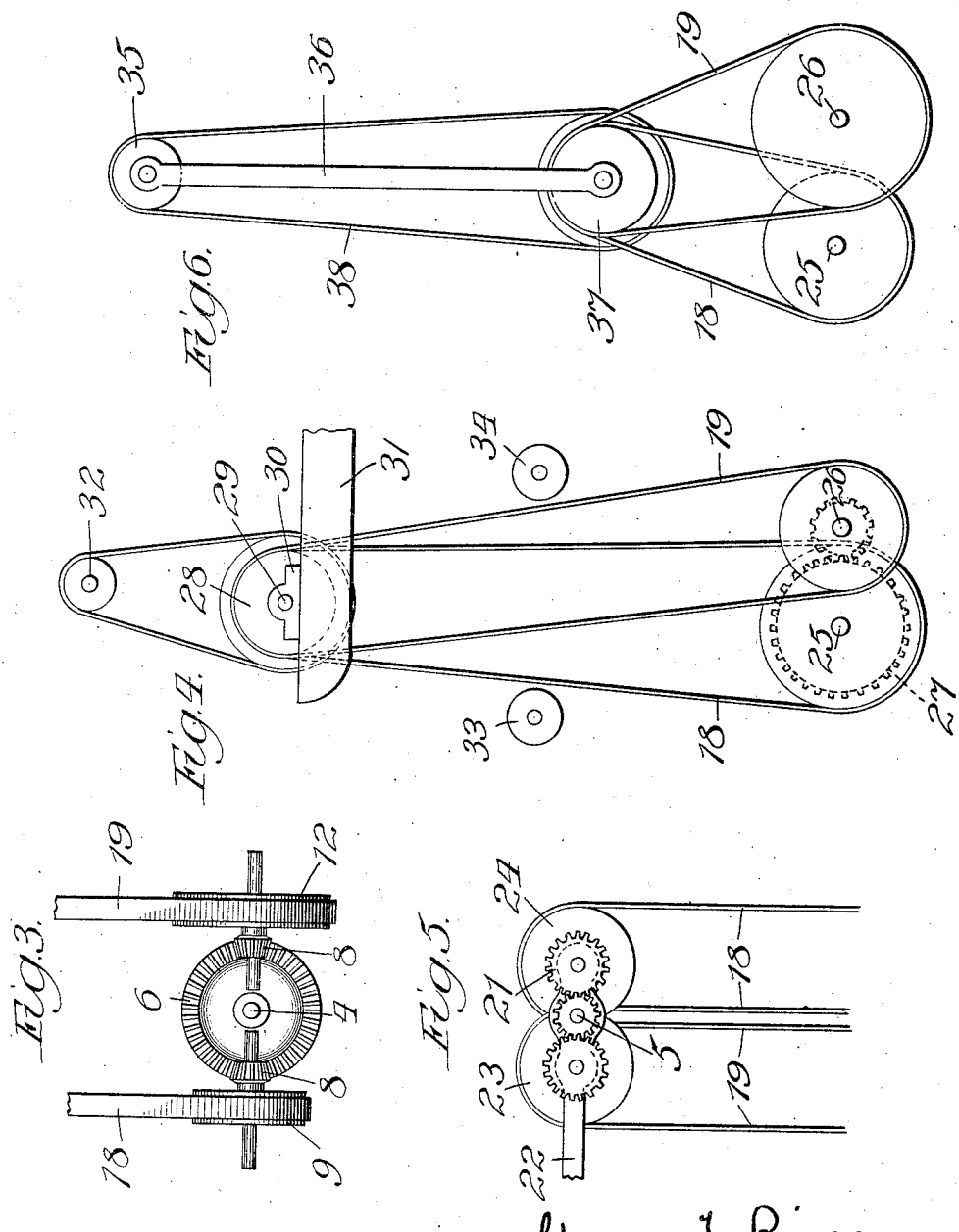

GEORGE T. REISS, OF HAMILTON, OHIO, ASSIGNOR TO NILES-BEMENT-POND COMPANY OF JERSEY CITY, NEW JERSEY.

MECHANISM FOR PRODUCING RECIPROCATING MOTION.

No. 804,980.     Specification of Letters Patent.     Patented Nov. 21, 1905.

Application filed April 1, 1905. Serial No. 253,264.

*To all whom it may concern:*

Be it known that I, GEORGE T. REISS, a citizen of the United States, residing at Hamilton, Butler county, Ohio, (whose post-office address is care Niles Tool Works, Hamilton, Ohio,) have invented certain new and useful Improvements in Mechanism for Producing Reciprocating Motion, of which the following is a specification.

This invention, pertaining to improvements in mechanism for producing reciprocating motion, will be readily understood from the following description, taken in connection with the accompanying drawings, in which—

Figure 1 is a side elevation of a construction exemplifying the present invention as applied to a metal-planing machine; Fig. 2, an end elevation of the same; Figs. 3 to 6, inclusive, diagrams illustrating a few of the many modifications to which the invention lends itself.

In the drawings, and giving consideration for the present only to Figs. 1 and 2, 1 indicates the bed of a metal-planing machine; 2, the table of the same; 3, one of the housings; 4, one of the shafts pertaining to the usual driving mechanism of the planer and serving when turned in one direction or the other to bring about a reciprocating motion of the planer-table; 5, a driving-shaft mounted in suitable bearings and adapted to have motion imparted to it continuously in one direction by any suitable means—as, for instance, a belt-pulley upon the shaft or a motor connected with it; 6, a bevel-gear on shaft 4; 7, a shaft suitably supported in bearings at right angles to shaft 4; 8, a bevel-pinion fast on shaft 7 and gearing into gear 6; 9, a pulley fast on shaft 7; 10, a counter-shaft disposed in fixed bearings parallel with shaft 7; 11, simple gearing connecting shafts 10 and 7, whereby those shafts turn in relatively opposite directions; 12, a pulley fast on shaft 10; 13, a pulley fast on shaft 5 in the plane of pulley 9; 14, a pulley fast on shaft 5 in the plane of pulley 12; 15, a frame so mounted that a portion of it is capable of movement in a path at right angles to shaft 5, this frame being illustrated as swinging upon shaft 5; 16, a part connected with the frame 15 to serve in swinging it either direct or by communication from other appropriate mechanism; 17, a pair of belt-tightening pulleys carried by the swinging frame, one in the plane of pulleys 12 and 14 and the other in the plane of pulleys 9 and 13; 18, a slack belt engaging pulleys 9 and 13 and adapted to have one of its sides engaged by one of the belt-tightening pulleys; 19, a slack belt engaging pulleys 12 and 14 and adapted to be engaged by the other one of the belt-tightening pulleys upon the side opposite that of the first-mentioned tightening-pulley.

Normally shaft 5 is in motion, both belt-tightening pulleys are out of action, and both belts are running idly, and the planer mechanism at rest. If the swinging frame be pushed inwardly toward the housing, belt 19 will become tightened and the planer-table will be driven in one direction. If, now, the frame be swung outwardly, then the tightening-pulley just mentioned will be relieved and belt 19 be left slack and the other tightening-pulley will go into action and tighten belt 18 and in an obvious manner cause the planer-table to be driven in the opposite direction. It is to be particularly noted that the two belts run in the same direction and are both open belts, the change in the direction of table motion not being brought about by the diversity of the direction of belt motion, but by the action of mechanism disposed beyond the terminal pulleys of the two belts.

Fig. 3 illustrates a modification, in which instead of the gears 11 as a means for causing one belt to produce motion upon shaft 4 in a direction opposite to that produced by the other belt each belt has its driving-pulley connected with separate bevel-pinions, the two bevel-pinions being opposite each other, so that while turning in the same direction they produce opposite effects on gear 6.

In each of the above examples it has been assumed that the planer-shaft 4 is at right angles to shaft 5, constituting the driving-shaft, and in this arrangement the bevel-geared construction comes nicely into play; but in many cases the bevel-gearing is neither present nor desirable. In Fig. 4 is illustrated a modification in which the driven pulleys of the two belts are on shafts 25 and 26, connected by simple gears 27, so that they turn in opposite directions. These two shafts 25 and 26 may well be two of the ordinary shafts found in the transmitting-train of a metal-planer. In the modification now being described instead of moving the belt-tightening pulleys to the belt the belts are moved to the belt-tightening pulleys. Shaft 29 is in box 30, shifting on bracket 31, this shaft carrying the driving-pulley 28 for the two belts. The belt-tightening pulleys 33 and 34 are in a fixed position, and by shifting the shaft 29 either belt can in an obvious manner be brought against its tightening-pulley, and thus be put under strain for driving duty. Shaft 29 may be conveniently driven by belt from pulley on shaft 32, occupying a fixed position.

In all of the examples thus far referred to the belts have been tightened by means of extra tightening-pulleys; but they may be tightened by shifting their main pulleys. Thus in Fig. 5 the pulleys 23 and 24, driving the respective belts, are carried in an oscillating frame 22, having its axis of oscillation at shaft 5, connected by gearing 21 with the two pulleys. By rocking the frame 22 either of the driving-pulleys 23 or 24 may be caused to tighten its belt and make that belt effective. Again, in Fig. 6 the two driving-pulleys 37 for the main belts are carried on a swinging frame 36, which being swung one way or the other tightens either belt selectively. In this arrangement motion is imparted to the shaft of pulleys 37 by means of belt 38 from driving-pulley 35, located at the axis of oscillation of the swinging frame.

It is to be observed that all of the examples are characterized by the pair of normally slack belts moving in the same direction, and thus capable of deriving their motions from a single shaft, their reversing effect being due not to diversity of belt action, but to the reversing character of the transmitting mechanism between the terminal pulleys of the belts and the mechanism to which reversing motion is to be imparted.

I claim as my invention—

1. In driving mechanism for producing reciprocating motion, the combination, substantially as set forth, of a shaft to which motion is to be transmitted in selective directions, a pair of driven pulleys, mechanism connecting said driven pulleys with such shaft in such manner that the turning of the two pulleys in one direction corresponds with reverse direction of motion of said shaft, a driving-pulley in line with each driven pulley and arranged for rotary motion in a single direction, an open slack belt connecting each of the driving-pulleys with one of the driven pulleys, and means for tightening said belts alternatively.

2. In driving mechanism for producing reciprocating motion, the combination, substantially as set forth, of a shaft to which motion is to be transmitted in selective directions, a pair of driven pulleys, mechanism connecting said driven pulleys with such shaft in such manner that the turning of the two pulleys in one direction corresponds with reverse direction of motion of said shaft, a driving-pulley in line with each driven pulley and arranged for rotary motion in a single direction, an open slack belt connecting each of the driving-pulleys with one of the driven pulleys, and a shifting-pulley device for tightening said two belts alternatively.

GEORGE T. REISS.

Witnesses:
ROBERT J. SHANK,
M. S. BELDEN.